Aug. 11, 1925.
D. BLUMBERG
TRANSMISSION BAND
Filed Jan. 26, 1925
1,549,179
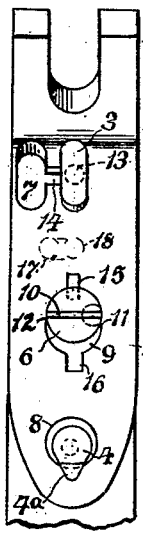
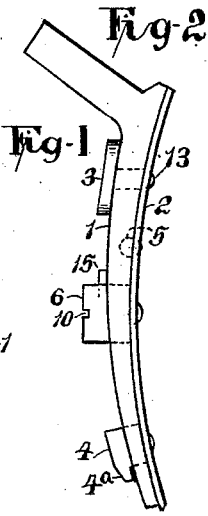
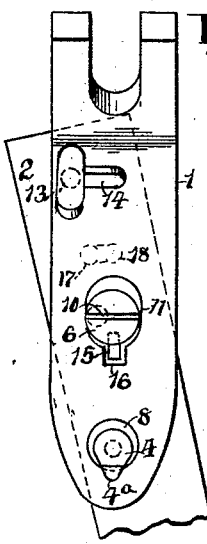
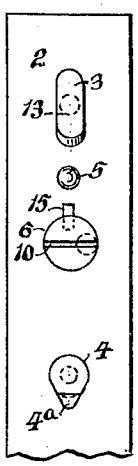
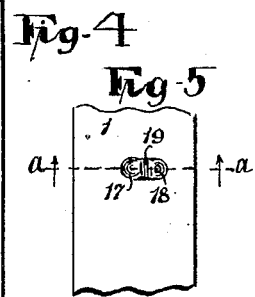
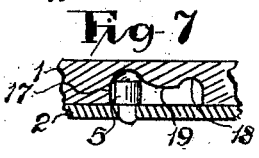
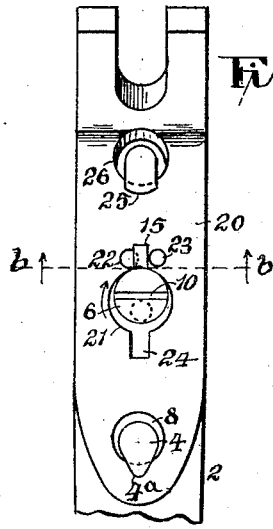
INVENTOR.
David Blumberg.
BY
Geo. D. Phillips ATTORNEY Patented Aug. 11, 1925.

1,549,179

UNITED STATES PATENT OFFICE.

DAVID BLUMBERG, OF BRIDGEPORT, CONNECTICUT.

TRANSMISSION BAND.

Application filed January 26, 1925. Serial No. 4,921.

*To all whom it may concern:*

Be it known that I, DAVID BLUMBERG, citizen of the United States, residing at Bridgeport, in the county of Fairfield and State of Connecticut, have invented certain new and useful Improvements in Transmission Bands, of which the following is a specification.

This invention relates to ears for transmission bands for automobiles. It has for its object to provide a simple construction that will permit the ready attachment and detachment of the ear. The novelty of construction and advantage of the device will be fully understood from the following description and claims when taken in connection with the annexed drawings, in which—

Figure 1 represents an elevation of the ear and broken section of the transmission or brake band interlocked therewith—

Figure 2 is a side elevation of the ear and broken section of the brake band—

Figure 3 is an elevation of the ear and broken section of the brake band thrown to one side to permit the ear to be attached or detached therefrom—

Figure 4 is a broken view of the brake band—

Figure 5 is a broken view of the inside surface of the ear—

Figure 6 is an enlarged broken cross sectional view of the ear on line *a—a* of Figure 5—

Figure 7 is an enlarged broken cross sectional view of the ear and brake band—

Figure 8 is an enlarged broken cross sectional view of the ear on line *b—b* of Figure 9, and Figure 9 is a modified construction of the ear employing the same cam stud feature as shown in the other views.

1 represents the ear and 2 the brake band. Secured to the brake band, Figure 4, is the T-shaped stud 3, stud 4 having the overhanging lip 4$^a$ and the stud 5 projecting above the surface of the band as shown in Figures 2 and 7. Intermediate of studs 3 and 4, is the pivotally supported cam stud 6.

7, Figure 1, is an opening through the ear for the T-shaped stud 3, 8 is an opening for the stud 4, and 9 is an elongated opening in which the cam stud 6 operates. By means of the screw driver slot 10, said stud is rotated to bear against the side wall 11 of the opening 9 and force the upper end of the brake band to the left as shown in Figure 3.

When the band is in this position, the T-shaped stud is located in its elongated opening in the ear, and the stud 4 is also positioned in its opening 8, as shown in Figure 3.

When the brake band is in the position shown in Figure 3, the cam stud 6 is rotated to the left to bear against the side wall 12 of the opening 9 to throw the brake band to the right and align it with the ear as shown in Figure 1. This side movement of the band will carry the stem 13 of the T-shaped stud 3 into the lateral opening 14, as shown. The T-shaped stud 3 bears against the outer surface of the ear and holds the ear firmly against the brake band as shown in Figure 2. If the ear is disengaged from the pedal shaft it will be actuated by the cam and the band will remain stationary, but if the ear is in contact with the shaft, the band will move, as before described.

To prevent accidental displacement of the cam stud in its locked position, as shown in Figure 1, it is provided with the pin 15 which frictionally engages the outer surface of the ear when the cam stud is rotated, and when the cam stud is reversed, Figure 3, the pin will be over the opening 16 in the ear, and the T-shaped stud 3, as before mentioned, in the elongated opening 7, the ear can then be readily removed from the brake band or inserted thereon.

Another feature for safeguarding accidental displacement of the ear locked to the band, consists of the pin 5 and the two recesses 17, 18, in the under surface of the ear, Figures 5 and 6. When the band and ear are in the position shown in Figure 3, the pin 5, Figure 7, will be in the recess 17, and when the brake band is thrown into its normal position in alignment with the ear, the pin will be forced over the curved incline 19 until it drops into the recess 18 as the brake band lines up with the ear. Once in this position, it will take more or less frictional effort to dislodge it.

In the ear construction 20, shown in Figure 9, the same cam stud also applies. In this view it is shown locked against the upper wall of the opening 21. 22, see also Figure 8, is a stud provided with a double incline upper surface over which the pin is forced until it drops against the locating pin 23, from which it will require effort to dislodge it. The opening 21 has the opening 24 leading therefrom to admit the pin 15 when the cam stud is reversed in removing the ear. 25 is an overhanging stud of the brake band locked in the opening 26 of the ear. The construction shown in Figure 9 simply illustrates the several uses for which the cam stud may be applied.

Having thus described my invention what I claim is:—

1. A transmission band having lengthwise overhanging spaced studs and an intermediate pivotally supported cam stud, an ear having openings to receive said studs, the side walls of the opening for the cam stud adapted to be engaged by said cam stud to lock the ear to the band when rotated in one direction, and unlock the ear when reversely rotated.

2. A transmission band, studs having overhanging lips secured to the band, an ear having openings to receive the studs, a pivotally supported cam stud on the band, said ear having an opening to receive the cam stud whose side walls are alternately engaged by the cam stud to align the ear with the band and lock the ear thereto, and to throw the ear and band out of alignment and release the ear.

3. A transmission band, a pivotally supported cam stud mounted thereon, an ear having an opening to receive the cam stud whose side walls are engaged by said cam stud to align the ear with the band and throw them out of alignment when said cam stud is reversed.

4. A transmission band, a pivotally supported cam stud mounted thereon, an ear having an opening to receive the cam stud whose side walls are engaged by the cam stud to align the ear with the band when rotated in one direction, and throw them out of alignment when reversely rotated, a pin projecting from the cam stud adapted to frictionally engage the outer surface of the ear when the cam stud is rotated.

5. A transmission band, a pivotally supported cam stud mounted thereon, an ear having an opening to receive the cam stud in which the cam stud is rotated to lock the ear to the band and unlock the same by its engagement with the wall of the opening, said band having a projecting stud, said ear having spaced recesses on its under surface to receive the pin, the space between the recesses forming a friction surface to prevent accidental displacement of the ear.

6. A transmission band, a pivotally supported cam stud mounted thereon, an ear having an opening therefor in which the cam stud is rotated to lock the ear to the band by its engagement with the wall of said opening, a pin projecting from the cam stud, and means for temporarily locking the pin to prevent accidental rotary movement of the cam stud.

In testimony whereof I affix my signature.

DAVID BLUMBERG.